United States Patent
del Puerto et al.

(10) Patent No.: US 10,196,002 B1
(45) Date of Patent: Feb. 5, 2019

(54) VEHICLE SEATING ASSEMBLY

(71) Applicant: Ford Global Technologies, LLC, Dearborn, MI (US)

(72) Inventors: Raul Emilio del Puerto, Mexico City (MX); Gerardo Diaz Paredes, Mexico City (MX); Javier Bartolo Trujillo, El Oro de Hidalgo (MX); Gregory Hagedorn, Bloomfield Hills, MI (US); Ivonne Ruth Lepe, Chapultepec (MX); Arturo Emmanuel Salas Garcia, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/667,034

(22) Filed: Aug. 2, 2017

(51) Int. Cl.
  *B60R 7/00* (2006.01)
  *B60R 7/04* (2006.01)
  *B60N 2/70* (2006.01)

(52) U.S. Cl.
  CPC ............ *B60R 7/043* (2013.01); *B60N 2/7005* (2013.01); *B60N 2205/30* (2013.01)

(58) Field of Classification Search
  CPC .... B60R 7/043; B60N 2/7005; B60N 2205/30
  See application file for complete search history.

(56) References Cited

U.S. PATENT DOCUMENTS

| | | | |
|---|---|---|---|
| 6,419,313 B1 | 7/2002 | Newman | |
| 6,419,379 B1* | 7/2002 | Hulse | B60N 3/002 362/488 |
| 6,652,024 B2 | 11/2003 | Prasatek | |
| 9,365,142 B1* | 6/2016 | Line | B60N 2/62 |
| 9,414,682 B1* | 8/2016 | Mezzera | A47C 7/34 |
| 9,950,674 B1* | 4/2018 | Kalergis | B60N 2/3009 |
| 2010/0128493 A1* | 5/2010 | Hipshier | B60R 7/04 362/459 |
| 2015/0165950 A1* | 6/2015 | Sachs | B60N 2/62 297/452.48 |
| 2015/0274069 A1* | 10/2015 | Cuddihy | G01J 5/00 315/77 |
| 2016/0144792 A1 | 5/2016 | Gawade et al. | |
| 2016/0207433 A1* | 7/2016 | Kondrad | B60N 2/02 |
| 2018/0178693 A1* | 6/2018 | Iyer | B60N 2/002 |
| 2018/0265010 A1* | 9/2018 | Line | B60R 7/043 |

FOREIGN PATENT DOCUMENTS

| | | | |
|---|---|---|---|
| CA | 2311265 A1 * | 12/2000 | ............... B60N 2/70 |
| WO | WO-9935002 A1 * | 7/1999 | ............. B60N 2/206 |

* cited by examiner

*Primary Examiner* — Lori L Lyjak
(74) *Attorney, Agent, or Firm* — Vichit Chea; Price Heneveld LLP

(57) ABSTRACT

A vehicle seating assembly is provided herein. The seating assembly includes a support structure defining a bin. A subassembly is disposed over the support structure and includes a cushion. The subassembly defines a void within the cushion. The void has a larger cross-sectional area than the bin. A seat insert is disposed within the void and is disposed over the bin.

15 Claims, 3 Drawing Sheets

VEHICLE SEATING ASSEMBLY

FIELD OF THE INVENTION

The present invention generally relates to a vehicle seating assembly, and more particularly to a vehicle seating assembly having a bin therein.

BACKGROUND OF THE INVENTION

Vehicles that include modular seating designs provide increased comfort and value to the consumer.

SUMMARY OF THE INVENTION

According to one aspect of the present disclosure, a vehicle seating assembly is disclosed. The vehicle seating assembly includes a support structure defining a bin. A subassembly is disposed over the support structure and includes a cushion. The subassembly defines a void within the cushion. The void has a larger cross-sectional area than the bin. A seat insert is disposed within the void and disposed over the bin.

According to another aspect of the present disclosure, a seating assembly for a vehicle is disclosed. The seating assembly includes a support structure defining first and second bins. A subassembly is operably coupled to the support structure and includes a seat cushion. First and second seat inserts are operably coupled to the support structure and are disposed over the first and second bins. A bottom portion of the first and second seat inserts have a larger cross-sectional area than the bin.

According to yet another aspect of the present disclosure, a vehicle seating assembly is disclosed. The vehicle seating assembly includes a support structure defining a bin having a first access area. A subassembly is disposed over the support structure and defines a void having a second access area. The second access area less than the first access area. A seat insert is disposed within the void and has a bottom portion having a larger area than the bin first access area.

These and other aspects, objects, and features will be understood and appreciated by those skilled in the art upon studying the following specification, claims, and appended drawings.

DETAILED DESCRIPTION OF EXAMPLES

Figure 1:
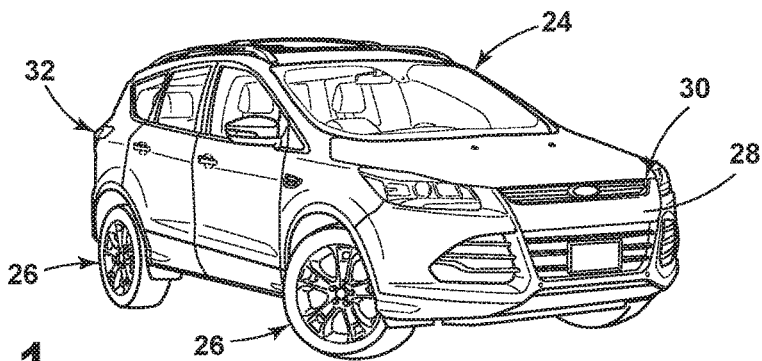
FIG. 1 is a front perspective view of a vehicle having a vehicle seating assembly disposed therein, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-6, reference numeral 10 generally designates a vehicle seating assembly including a support structure 12 defining a bin 14. A subassembly 16 is disposed over the support structure 12 and includes a cushion 18. The subassembly 16 defines a void 20 therein. The void 20 may have a larger cross-sectional area than the bin 14. A seat insert 22 is disposed within the void 20 and disposed over the bin 14.

Figure 2:
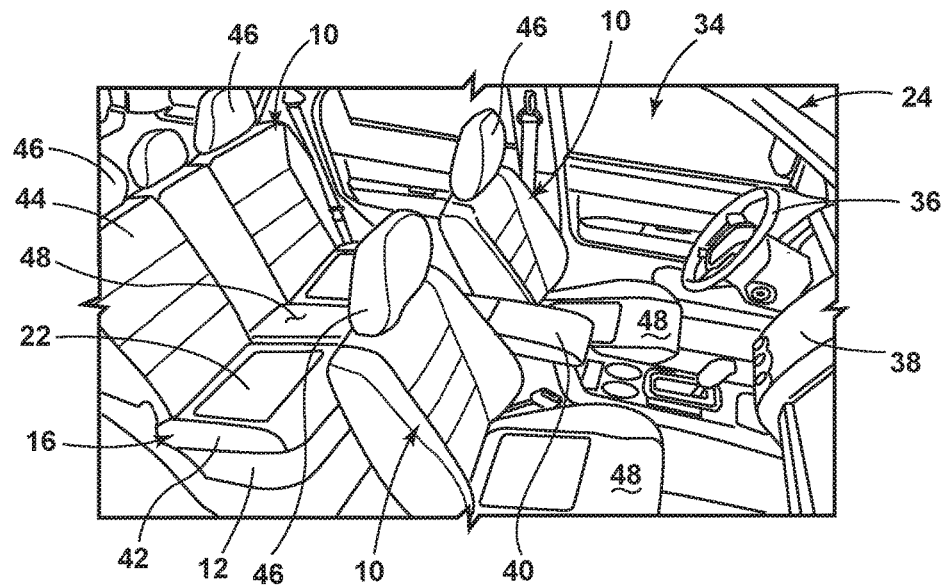
FIG. 2 is a front perspective view of a vehicle interior having the vehicle seating assembly, according to some examples.

Referring again to FIGS. 1 and 2, a vehicle 24 includes the vehicle seating assembly 10 and also includes other features such as multiple wheels 26, a bumper 28, a front portion 30, and a rear portion 32. The vehicle 24 may be of any type including a compact vehicle, a mid-size vehicle, a sport utility vehicle, a van, a truck, and/or any other type of vehicle. As illustrated in the example shown in FIG. 2, an interior 34 of the vehicle 24 may include multiple vehicle seating assemblies 10. The vehicle seating assembly 10, as shown in the example of FIG. 2, is generally a rear passenger vehicle seat. However, it is also contemplated that the vehicle seating assembly 10 may be a front passenger vehicle seat having a driver's seat, a passenger's seat, and/or a center seat. The interior 34 of the vehicle 24 may also include other features such as a steering wheel 36, a dashboard 38, a center console 40 for extra storage, etc. The interior 34 of the vehicle 24 may also include multiple vehicle seating assemblies 10, for example in the rear passenger seat and the front driver/passenger seat. However, it is also contemplated that the vehicle interior 34 may include only a single vehicle seating assembly 10, which includes the seating assembly 10 provided herein.

Figure 3:
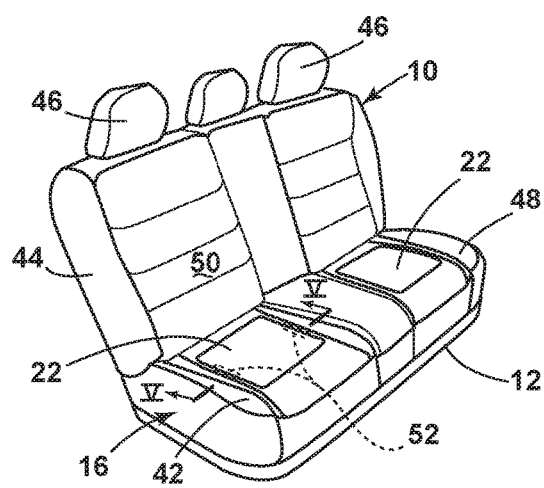
FIG. 3 is a front perspective view of the vehicle seating assembly, according to some examples.

Referring to FIGS. 2 and 3, the vehicle seating assembly 10 includes a seat-base 42 and a seat-back 44. The vehicle seating assembly 10 may also include a headrest 46 and a coverstock 48. The coverstock 48 is generally disposed over the seat-base 42 and the seat-back 44. Moreover, the coverstock 48 is configured to provide a desired aesthetic look and feel to the vehicle seating assembly 10. Additionally, the coverstock 48 forms a passenger engagement surface on a top surface 50 of both the seat-base 42 and the seat-back 44 of the vehicle seating assembly 10. Moreover, the vehicle seating assembly 10 may include one or more controllers having functions such as a climate control system, a heater mat, thigh extensions, thigh bolsters, etc.

With further reference to FIGS. 2 and 3, the seat insert 22 may be disposed in a portion of the seat-base 42 such that the cushion 18 and/or coverstock 48 of the seat-base 42 may fully, or partially, encompass the seat insert 22 when the seat insert 22 is disposed within the void 20. Thus, when disposed within the void 20, the removable insert 22 may substantially conceal the bin 14. A concealed handle 52 may be utilized for removing the seat insert 22 from the void 20.

Figure 4:
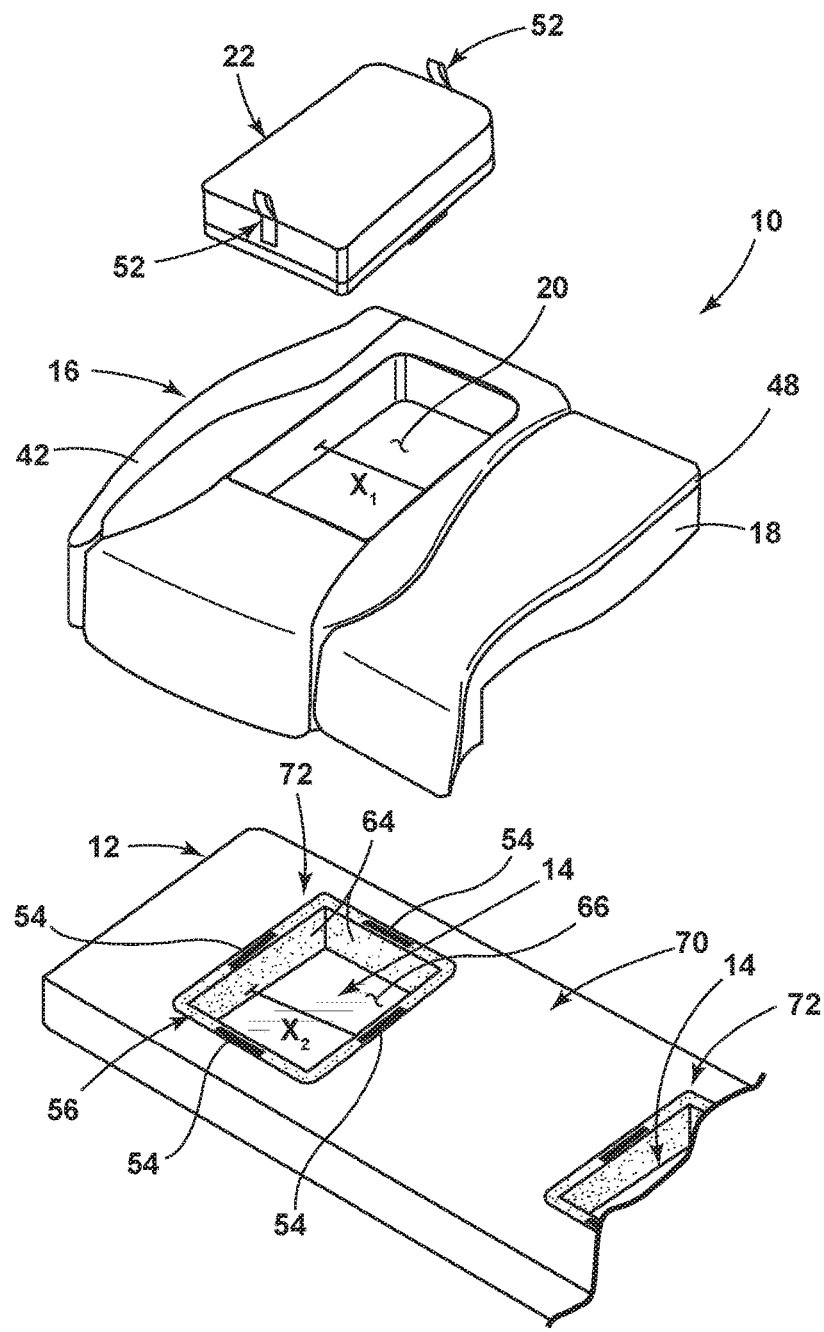
FIG. 4 is a front perspective exploded view of the seating assembly, according to some examples.

Referring to FIG. 4, the vehicle seating assembly 10 includes the support structure 12, which may have an open shell construction. The support structure 12 generally includes a center portion 70 and two side portions 72 disposed on either side of the center portion 70. Each of the portions 70, 72 may define one or more bins 14 such that storage underneath the vehicle seating assembly 10 is possible. Moreover, the support structure 12 provides support to the seat-base 42 such that the vehicle seating assembly 10 may not include a frame to define a frameless seating assembly 10. In the example illustrated in FIG. 4, the center portion 70 is continuous and connects the side portions 72. However, it is also contemplated that the center portion 70 may also include a bin 14.

With further reference to FIG. 4, the subassembly 16 generally includes the cushion 18, which may include polyurethane foam. However, it is also contemplated that the subassembly 16 may include another type of foam such as a memory foam, soft foam, or other foam as known to one of ordinary skill in the art. As provided herein, the seat cushion 18 may define one or more voids 20. The voids 20 may be disposed vertically above the bins 14 of the support structure 12. Furthermore, the voids 20 may have a larger cross-sectional area, width $x_1$, and/or length than the cross-sectional area, width $x_2$, and/or length of the bin 14 such that a rim of the bin 14 is visible when the insert 22 is removed from the subassembly 16.

Coupling members 54 may be disposed around a perimeter 56 of the bin 14. According to some examples, the coupling members 54 may include a magnetically attractive material, such as iron or other magnetic material, which is mounted around the perimeter 56 of the bin 14. The insert 22 may include one or more magnets 84 (FIG. 6) on a bottom portion thereof. While being relatively fixed, the coupling members 54 may be movable within a fixed range so that the coupling members 54 are able to accommodate tolerances in the positioning of the insert 22 and the coupling members 54 relative to the bin 14. It will be appreciated that the seat coupling members 54 may be Velcro, and/or another type of fixing device, as known by one of ordinary skill in the art, which would be sturdy enough to withstand the movement of the vehicle 24.

Figure 5:
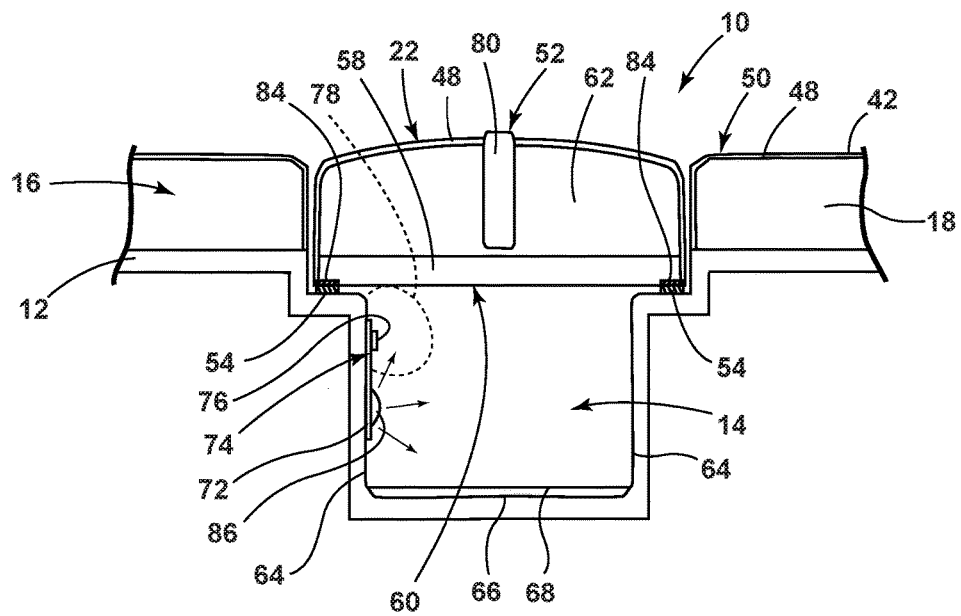
FIG. 5 is a cross-sectional view of the seating assembly taken along the line V-V of FIG. 3, according to some examples.
Figure 6:
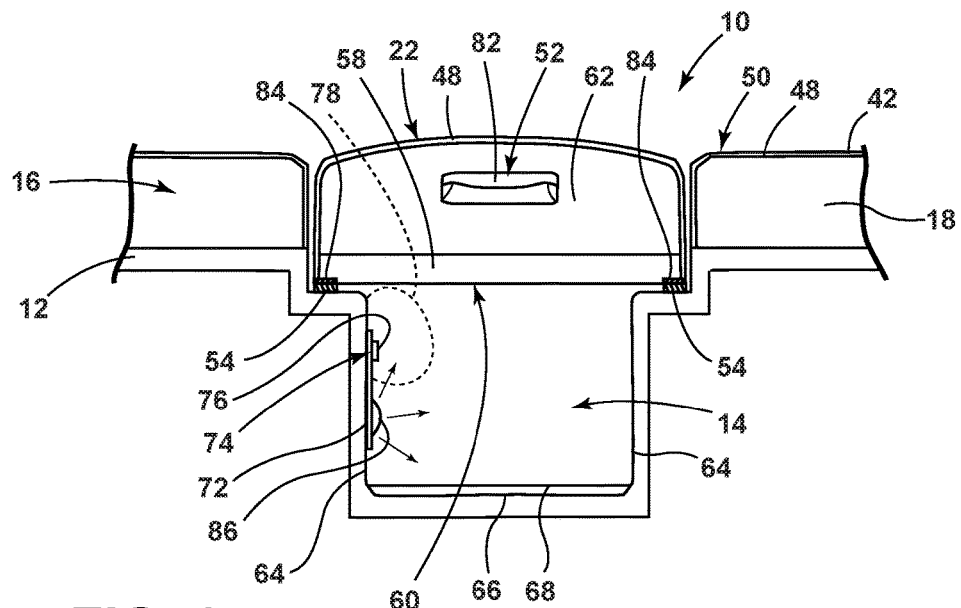
FIG. 6 is a cross-sectional view of the seating assembly taken along the line V-V of FIG. 3 illustrating the seat insert having an integrally formed grasping handle, according to some examples.

With reference to FIGS. 5 and 6, the seat insert 22 is disposed over the bin 14. The seat insert 22 is operably coupled to the coupling members 54 in order to be securely held onto the vehicle seating assembly 10. As shown in the example illustrated in FIG. 5, a suspension mat 58 may define a bottom portion 60 of the seat insert 22. The suspension mat 58 may be configured to provide additional comfort to a vehicle passenger. The suspension mat 58 provides rigidity such that the seat insert 22 does not collapse under the weight of the vehicle passenger. The seat insert 22 includes a padded layer 62 disposed on top of the suspension mat 58. The coverstock 48 may be disposed on the padded layer 62 or suspension mat 58.

Referring again to the examples shown in FIGS. 5 and 6, the padded layer 62 is generally made of polyurethane foam. However, it is also contemplated that the seat insert 22 may include a memory foam or other soft foam as known by one of ordinary skill in the art. Additionally, the seat insert 22 may also include a wire structure to provide extra rigidity to the vehicle seating assembly 10. However, it is also contemplated that the seat insert 22 is made only of foam and does not include any additional structure.

Referring to the examples shown in FIGS. 4-6, the seat insert 22 may be a generally rectangular seat insert 22. The bin 14 is suitable for storage of personal items, maps, tools and the like. The bin 14 includes a plurality of sides 64 and a bottom surface 66. While shown as a single depressed area, the bin 14 may include a plurality of depressed areas and/or compartments to help organize the items stored therein. A pad 68 may be disposed within the bin 14. The pad 68 can also prevent vibration and rattling of stored items therein.

In some examples, the seat insert 22 may be a specialized vehicle seat cushion 18 such that the seat insert 22 includes thigh supports such as thigh bolsters, thigh tilts, thigh extensions, cushion extensions, or other inserts such as a climate control system, and/or split-leg supports. Moreover, the seat insert 22 may be easily removable such that one seat insert 22 may be removed and replaced with a seat insert 22 having a different or additional functionality. This allows manufacturers of the vehicle seating assembly 10 to easily customize vehicle seating assemblies 10 based on consumer's desires. Additionally, it also allows consumers to upgrade the functionality of the vehicle seating assembly 10 even after the vehicle 24 is purchased and used by the consumer.

Referring to the examples shown in FIGS. 5 and 6, the seating assembly 10 may include a light source 86 within the bin 14 that is coupled to a circuit board 72. The light source 86 may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the seating assembly 10. Further, various types of LEDs are suitable for use as the light source 86 including, but not limited to, top-emitting LEDs, side-emitting LEDs, and others.

The circuit board 72 may be configured as a printed circuit board (PCB) that is operably coupled with a controller including control circuitry including LED drive circuitry for controlling activation and deactivation of the light source 86. The controller may be disposed in the vehicle 24 and/or within the seating assembly 10. The circuit board 72 may be configured in any fashion known in the art including, but not limited to, any flexible PCB and/or rigid PCB. The controller may activate the light source 86 based on a plurality of inputs and may modify the intensity of the emitted wavelengths of emitted light by pulse-width modulation, current control, and/or any other method known in the art. According to various examples, multicolored light sources, such as Red, Green, and Blue (RGB) LEDs that employ red, green, and blue LED packaging may be used to generate various desired colors of light outputs from a single light source according to known light color mixing techniques.

In the illustrated example, a position sensor 74, or proximity sensor, shown and described herein as capacitive sensor 76, can be provided within the bin 14 or in close proximity to the seat insert 22. The capacitive sensor 76 provides a sense activation field 78 that encompasses a portion of the seat insert 22 and can detect capacitive changes resulting from a conductor, such as the seat insert 22, being within the sense activation field 78 of the capacitive sensor 76 (e.g. within the void 20). The capacitive sensor 76 may be positioned in a predefined position such that the sensor may detect whether the seat insert 22 is disposed within the void 20. In some examples, if the capacitive change meets or exceeds a predetermined threshold level indicating that the seat insert 22 has moved to the removed position, the light source 86 can be prompted to activate accordingly. While the proximity sensor is shown and described herein as capacitive sensor 76, it should be appreciated that additional or alternative types of proximity sensors can be used for detecting various other signal changes, such as, but not limited to, inductive sensors, optical sensors, temperature sensors, resistive sensors, the like, or a combination thereof. Moreover, any other position-detecting device may be utilized in conjunction with, or in lieu of, the proximity sensor.

With further reference to FIG. 5, the seat insert 22 may further include the handle 52, such as a strap 80, for removing the seat insert 22 from the seating assembly 10. The strap 80 may be integrally formed with the coverstock 48 of the insert 22 or later attached thereto. The strap 80 may be disposed between the seat insert padded layer 62 and the cushion 18 of the seating assembly 10 to substantially conceal the strap 80 when the seat insert 22 is disposed within the void 20.

Referring to FIG. 6, the handle 52 may be configured as a grasping handle 82 that is disposed on the seat insert 22 as a recessed structure to ease the movement of the seat insert 22. As a recessed structure, those skilled in the art will appreciate that as the seat insert 22 is disposed within the void 20, the grasping handle 82 will not interfere with the seating assembly 10 and close mating tolerances can be achieved. Moreover, a latch may be disposed within the seat insert 22 for maintaining the seat insert 22 within the void 20. A release member may be disposed within the grasping handle 82. The latch may be moved by the passenger from the latched position to the unlatched position by applying finger pressure to the release member.

Use of the present disclosure may offer a variety of advantages. For instance, use of the seating assembly may provide additional concealed storage compartments within the vehicle. Moreover, the storage compartment may be placed in a locked state when items are stored within the storage compartment. The cushion may be readily replaced with other seat inserts employing a variety of features therein. The storage compartment provided herein may also reduce the weight of the vehicle by reducing hinge assemblies and/or other compartment components from the vehicle. The seating assembly may include any or all of the features provided herein and still be manufactured at low costs when compared to other seating assemblies.

According to various examples, a vehicle seating assembly is provided herein. The vehicle seating assembly includes a support structure defining a bin. A subassembly is disposed over the support structure and includes a cushion. The subassembly defines a void within the cushion. The void has a larger cross-sectional area than the bin. A seat insert is disposed within the void and disposed over the bin. Examples of the vehicle seating assembly can include any one or a combination of the following features:

- the vehicle seating assembly is frameless;
- the seat insert includes a seat insert and a suspension mat;
- a latch releasably coupling the seat insert to the support structure;
- the seat insert includes a climate control system;
- a light source disposed within the bin;
- a proximity sensor within the bin, the proximity sensor configured to detect a position of the seat insert;
- a strap configured to be disposed between the seat insert and the cushion to substantially conceal the strap when the seat insert is disposed within the void;
- a grasping handle that is disposed on the seat insert as a recessed structure;
- a light source within the bin is activated when the proximity sensor detects a removal of the seat insert; and/or
- a coupling member disposed on a rim portion of the support structure.

Moreover, a method forming a bin within a vehicle seating assembly is provided herein. The method includes forming a support structure defining a bin therein. A subassembly is disposed over the support structure including a cushion, wherein the cushion defines a void, the void having a larger cross-sectional area than the bin. A seat insert is disposed within the void and over the bin.

According to some examples, a seating assembly for a vehicle is provided herein. The seating assembly includes a support structure defining first and second bins. A subassembly is operably coupled to the support structure and includes a seat cushion. First and second seat inserts are operably coupled to the support structure and are disposed over the first and second bins. A bottom portion of the first and second seat inserts have a larger cross-sectional area than the bin. Examples of the seating assembly can include any one or a combination of the following features:

- the seat cushion fully encompasses the seat inserts; and/or
- the seat cushion is formed from polyurethane foam.

According to other examples, a vehicle seating assembly is provided herein. The vehicle seating assembly includes a support structure defining a bin having a first access area. A subassembly is disposed over the support structure and defines a void having a second access area. The second access area less than the first access area. A seat insert is disposed within the void and has a bottom portion having a larger area than the bin first access area. Examples of the vehicle seating assembly can include any one or a combination of the following features:

- a latch releasably coupling the seat insert to the support structure;
- a light source disposed within the bin;
- a proximity sensor within the bin, the proximity sensor configured to detect a position of the seat insert;
- a strap configured to be disposed between the seat insert and the cushion to substantially conceal the strap when the seat insert is disposed within the void; and/or a coupling member disposed on a rim portion of the support structure.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a support structure defining a bin;
   a subassembly disposed over the support structure and including a cushion, the subassembly defining a void within the cushion, wherein the void has a larger cross-sectional area than the bin; and
   a seat insert disposed within the void and disposed over the bin, wherein the vehicle seating assembly is frameless.

2. The vehicle seating assembly of claim 1, wherein the seat insert includes a seat insert and a suspension mat.

3. The vehicle seating assembly of claim 1, further comprising:
   a coupling member disposed on a rim portion of the support structure.

4. The vehicle seating assembly of claim 1, further comprising:
   a connector releasably coupling the seat insert to the support structure.

5. The vehicle seating assembly of claim 1, further comprising:
   a light source disposed within the bin.

6. The vehicle seating assembly of claim 1, further comprising:
   a proximity sensor within the bin, the proximity sensor configured to detect a position of the seat insert.

7. The vehicle seating assembly of claim 1, further comprising:
   a strap configured to be disposed between the seat insert and the cushion to substantially conceal the strap when the seat insert is disposed within the void.

8. A vehicle seating assembly comprising:
   a support structure defining a bin;
   a subassembly disposed over the support structure and including a cushion, the subassembly defining a void within the cushion, wherein the void has a larger cross-sectional area than the bin;
   a seat insert disposed within the void and disposed over the bin; and
   a grasping handle that is disposed on the seat insert as a recessed structure.

9. The vehicle seating assembly of claim 6, wherein a light source within the bin is activated when the proximity sensor detects a removal of the seat insert.

10. A vehicle seating assembly comprising:
    a support structure defining a bin;
    a subassembly disposed over the support structure and including a cushion, the subassembly defining a void within the cushion;

a seat insert disposed within the void and disposed over the bin; and a proximity sensor within the bin and configured to detect a position of the seat insert.

11. The vehicle seating assembly of claim 10 further comprising a light source within the bin, wherein the light source is activated when the proximity sensor detects removal of the seat insert.

12. The vehicle seating assembly of claim 10, wherein the void has a larger cross-sectional area than the bin.

13. The vehicle seating assembly of claim 10, wherein the seat cushion fully encompasses the seat insert.

14. The vehicle seating assembly of claim 10 further comprising a grasping handle that is disposed on the seat insert as a recessed structure.

15. The vehicle seating assembly of claim 10, wherein the vehicle seating assembly is frameless.

* * * * *